April 16, 1935.  W. T. BRODERICK  1,998,185
WIRE STRETCHER
Filed Aug. 2, 1934   4 Sheets-Sheet 1

Inventor
W. T. Broderick
By Clarence A. O'Brien
Attorney

April 16, 1935.  W. T. BRODERICK  1,998,185
WIRE STRETCHER
Filed Aug. 2, 1934   4 Sheets-Sheet 2

Inventor
W. T. Broderick
By *Clarence A. O'Brien*
Attorney

Inventor
W. T. Broderick
By Clarence A. O'Brien
Attorney

April 16, 1935. W. T. BRODERICK 1,998,185
WIRE STRETCHER
Filed Aug. 2, 1934 4 Sheets—Sheet 4
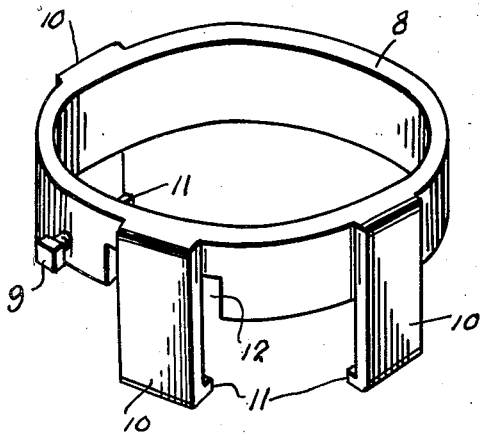
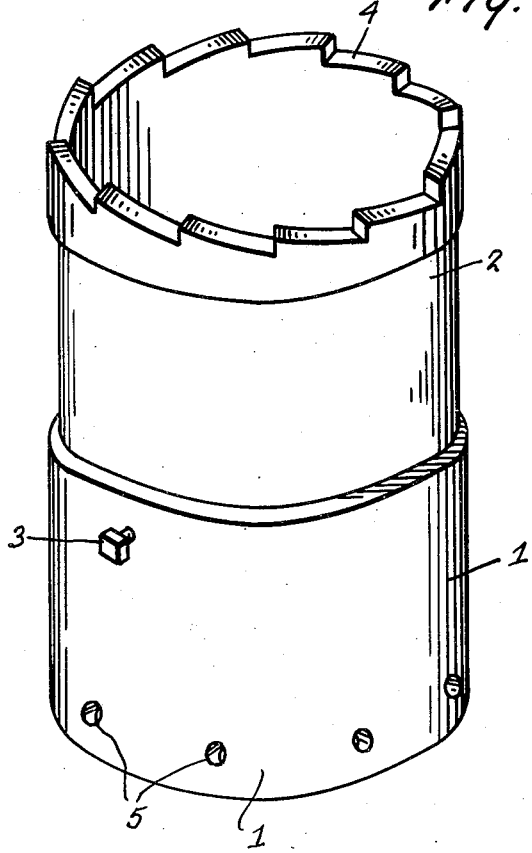
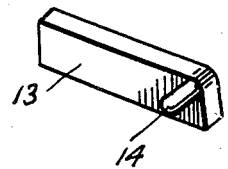
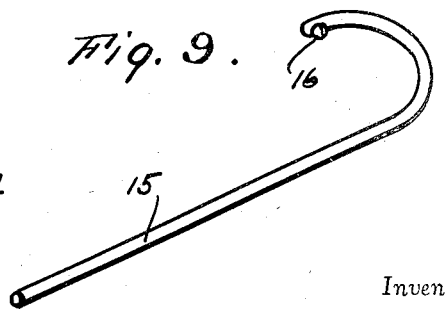
Inventor
W. T. Broderick
By Clarence A. O'Brien
Attorney Patented Apr. 16, 1935

1,998,185

UNITED STATES PATENT OFFICE 1,998,185

WIRE STRETCHER

Walter T. Broderick, Lovell, Wyo.

Application August 2, 1934, Serial No. 738,121

3 Claims. (Cl. 256—37)

This invention relates to a wire stretcher, the general object of the invention being to provide a cylinder for fitting around a post and having means thereon for attaching wires thereto and a collar with which the cylinder is rotatably connected and provided with means for attaching it to the post and ratchet means for holding the cylinder against retrograde movement as it is being rotated to stretch the wires, such means including ratchet teeth carried by the cylinder and a dog carried by the collar.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Fig. 6 is a view of the collar.

Fig. 7 is a perspective view of the cylinder.

Fig. 8 is a view of the dog.

Fig. 9 is a view of the tool used for rotating the cylinder.

Fig. 10 is a section on line 10—10 of Fig. 1.

Figure 1:
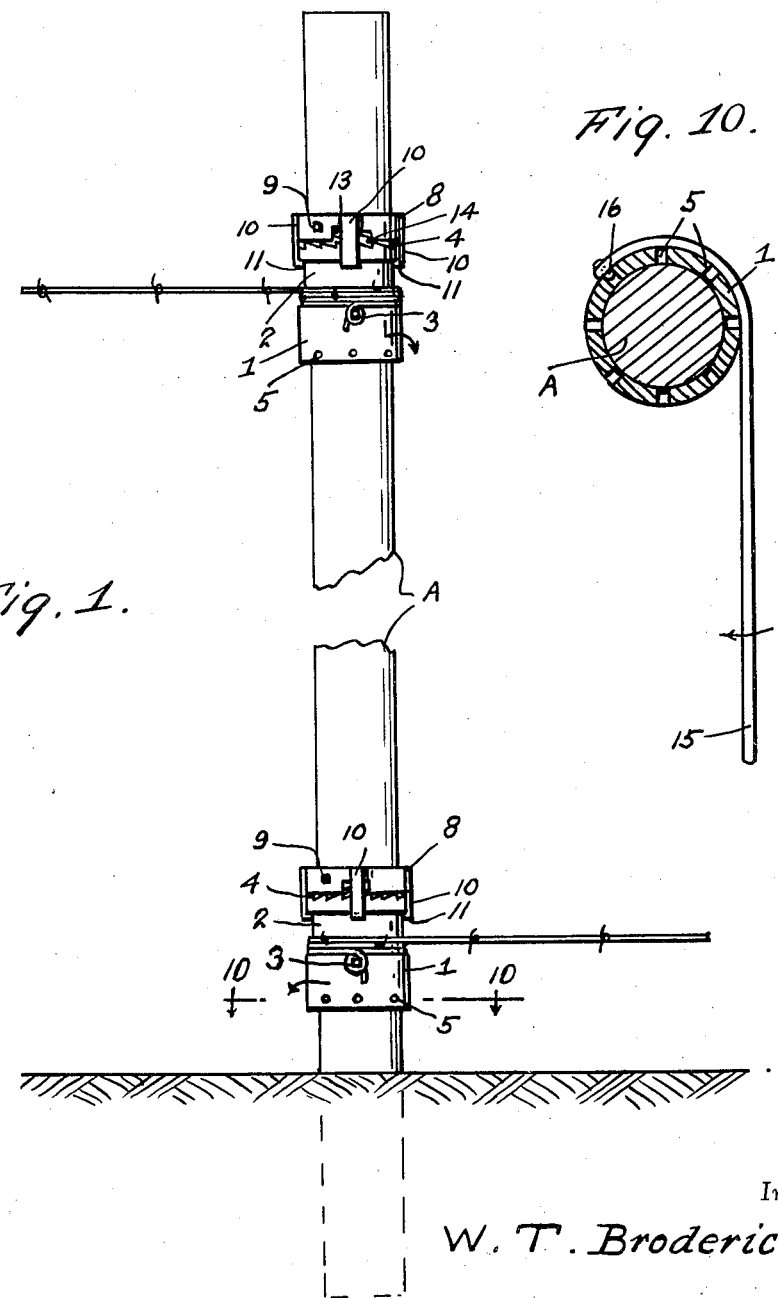
Fig. 1 is a view showing the invention in use.
Figure 2:
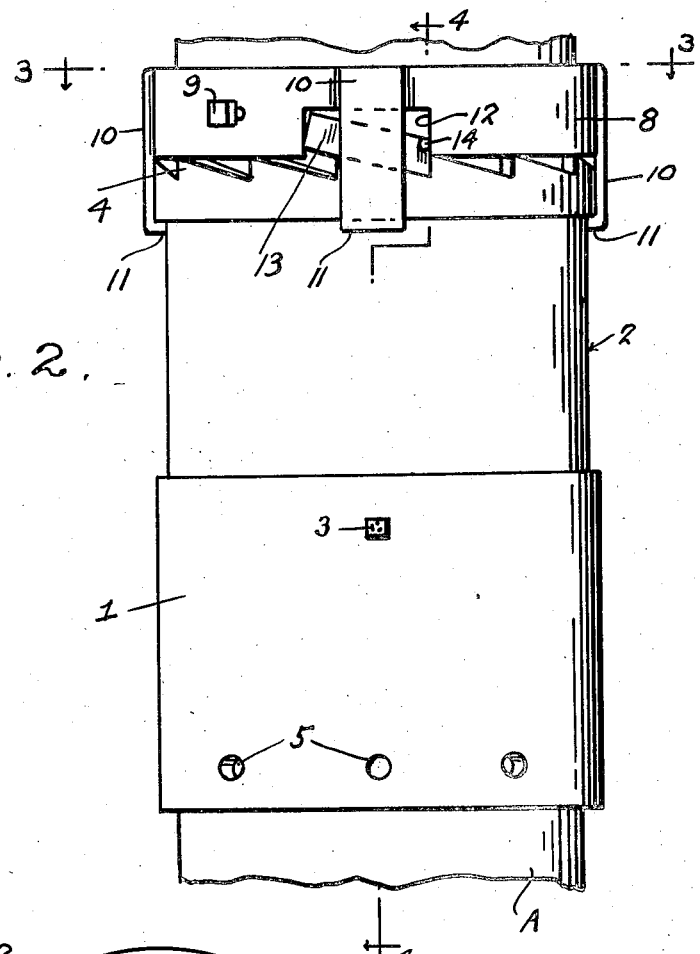
Fig. 2 is an elevation of one of the devices.
Figure 3:
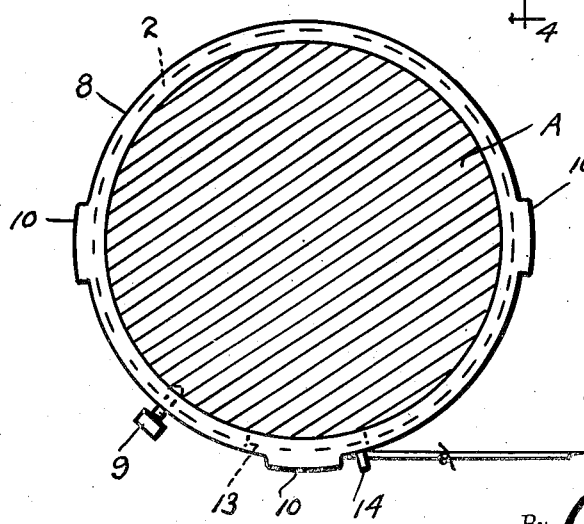
Fig. 3 is a section on line 3—3 of Fig. 2.
Figure 4:
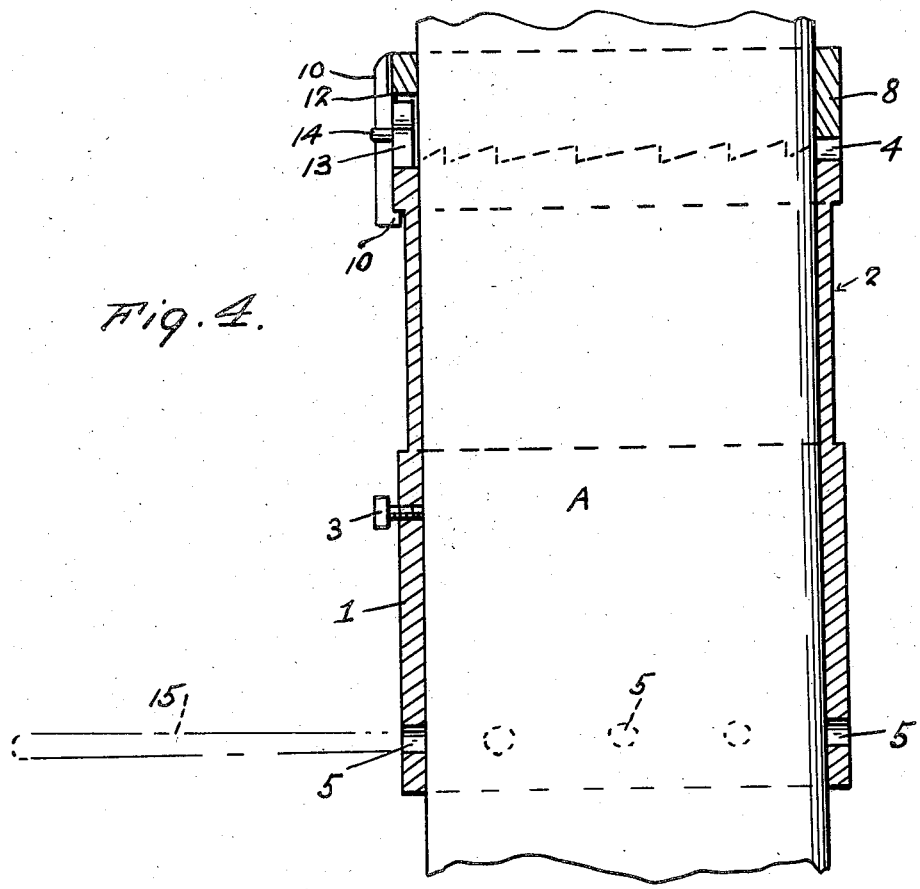
Fig. 4 is a section on line 4—4 of Fig. 2
Figure 5:
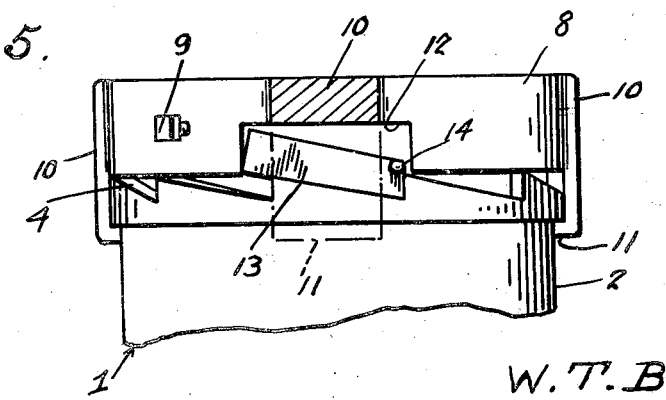
Fig. 5 is a fragmentary elevation with parts broken away to show how the dog engages the ratchet teeth.

In these drawings, the numeral 1 indicates a cylinder which has a wide exterior groove 2 therein for receiving a portion of the wire, the wire being adapted to be attached to the cylinder by means of a bolt 3 threaded in a hole in the cylinder slightly below the groove. The upper end of the cylinder is provided with the ratchet teeth 4 and an annular row of holes 5 is formed in the lower end of the cylinder. An upper collar 8 is attached to the post above the cylinder by a bolt 9. The collar 8 has depending lugs 10 attached to its exterior circumference with the lower ends of the lugs bent inwardly as at 11 to engage the upper shoulder formed by the groove 2. This collar 8 is also formed with a notch 12 for receiving a dog 13 for co-operating with the ratchet teeth for holding the cylinder against retrograde movement and a pin 14 is attached to the dog to enable it to be lifted above the teeth whenever desired. As will be seen, one of the lugs 10 extends across the notch 12 and that this lug acts to hold the dog in the notch while permitting free play of the dog.

The tool for rotating the cylinder is shown at 15 in Fig. 10 and has one end of hook-shape to partly encircle the cylinder and an inwardly extending lug 16 is formed on the back of the hook for engaging any one of holes 5 as shown in Fig. 10.

Thus, it will be seen that by first placing the cylinder collar over the post and clamping the collar 8 in position by the bolt 9, the device is ready for operation. It will be seen that the lugs 10 are so arranged that they can be placed into engagement with the shoulder on the cylinder or out of engagement therewith as desired. It will of course be understood, however, that the collar must be attached to the cylinder before the cylinder and collar are placed over the post.

The wire to be stretched is then attached to the bolt 3 as shown in Fig. 1 and then the tool 15 is used to rotate the cylinder and as this is being done, the wire is wound in the groove 2 and thereby stretched. The dog 13 engages the ratchet teeth 4 so that retrograde movement of the cylinder is prevented and thus the wire is held in stretched position. The device is intended to remain on the post and any time the wire slacks, it is simply necessary to give the cylinder a turning movement to tighten the wire. By making the ratchet teeth 4 on the different cylinders extend in opposite directions as shown in Fig. 1, a pair of the devices could be used for stretching a pair of wires which extend in opposite directions as shown in Fig. 1. When the device is to be used for stretching a wire woven fence, a plurality of the devices are used attached at intervals to the ends of some of the longitudinally extending wires of the fence.

It is thought from the foregoing description that the advantages and novel features of the invention will be readily apparent.

It is to be understood that changes may be made in the construction and in the combination and arrangement of the several parts, provided that such changes fall within the scope of the appended claims.

I claim:

1. A device of the class described comprising a cylinder having ratchet teeth at one end thereof, a collar, means for rotatably supporting the cylinder from the collar, and a dog carried by the collar for engaging the ratchet teeth for preventing retrograde movement of the cylinder when the same is being turned.

2. A device of the class described comprising a cylinder adapted to be placed over an upright and having an exterior annular shoulder at its upper part, means for attaching the end of a wire to the cylinder, the upper end of the cylinder having ratchet teeth, tool-receiving means carried by the cylinder for enabling it to be rotated, a collar, means for attaching it to the upright, depending hook lugs carried by the collar for engaging the shoulder for rotatably supporting the cylinder from the collar, said collar having a notch in its lower end partly covered by one of the lugs, and a dog loosely located in the notch and adapted to engage the ratchet teeth.

3. A wire stretcher comprising a cylinder adapted to be placed over an upright and having an exterior shoulder at its upper part, means for attaching a wire to the cylinder, the upper end of the cylinder having ratchet teeth, a collar adapted to be placed over an upright above the cylinder, depending lugs carried by the collar and having hooked lower ends engaging the shoulder for rotatably supporting the cylinder from the collar and a dog carried by the collar for engaging the ratchet teeth of the cylinder.

WALTER T. BRODERICK.